(12) United States Patent
Gao et al.

(10) Patent No.: US 7,369,647 B2
(45) Date of Patent: May 6, 2008

(54) VOICE MAIL NOTIFICATION USING INSTANT MESSAGING

(75) Inventors: Xiaofeng Gao, Alpharetta, GA (US); Maria Adamczyk, Alpharetta, GA (US); Karen Mullis, Loganville, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 54 days.

(21) Appl. No.: 10/759,165

(22) Filed: Jan. 20, 2004

(65) Prior Publication Data

US 2004/0146144 A1  Jul. 29, 2004

Related U.S. Application Data

(63) Continuation of application No. 10/232,749, filed on Sep. 3, 2002, now Pat. No. 6,707,890.

(51) Int. Cl.
*H04M 1/64* (2006.01)

(52) U.S. Cl. .............................. 379/88.12; 379/88.23; 379/88.14; 709/206

(58) Field of Classification Search ............. 379/88.12, 379/88.13, 88.14, 88.22; 709/206
See application file for complete search history.

(56) References Cited

U.S. PATENT DOCUMENTS

| | | | |
|---|---|---|---|
| 4,930,152 A | 5/1990 | Miller | |
| 4,933,967 A | 6/1990 | Lo et al. | |
| 4,951,044 A | 8/1990 | Nelson et al. | ............. 340/7.22 |
| 5,058,152 A | 10/1991 | Solomon et al. | |
| 5,313,515 A | 5/1994 | Allen et al. | |
| 5,353,331 A | 10/1994 | Emery et al. | |
| 5,361,295 A | 11/1994 | Solomon et al. | |
| 5,425,091 A | 6/1995 | Josephs | |
| 5,493,607 A | 2/1996 | Arumainayagam et al. | |
| 5,521,969 A | 5/1996 | Paulus et al. | |
| 5,559,800 A | 9/1996 | Mousseau et al. | ........ 370/85.13 |
| 5,572,578 A | 11/1996 | Lin et al. | |
| 5,572,583 A | 11/1996 | Wheeler, Jr. et al. | |
| 5,631,948 A | 5/1997 | Bartholomew et al. | |

(Continued)

FOREIGN PATENT DOCUMENTS

EP  0255325  2/1988

(Continued)

OTHER PUBLICATIONS

M., Day, et al.; Instant Messaging/Presence Protcol Requirements; Feb. 2000; pp. 1-25.

(Continued)

*Primary Examiner*—Gerald Gauthier
(74) *Attorney, Agent, or Firm*—Thomas, Kayden, Horstemeyer & Risley, LLP

(57) ABSTRACT

A system and method that notifies a voice mailbox subscriber of the receipt of a message at a voicemail server using instant messaging. A preferred embodiment of the invention includes an enhanced notification server that receives a notification of the message from the voicemail server, queries the availability of an instant messaging client via an instant messaging presence server, and forwards the notification to the instant messaging client via the instant messaging presence server if the instant messaging client is available. In preferred embodiments, provisions are made to forward the message to the subscriber via instant messaging.

17 Claims, 6 Drawing Sheets

U.S. PATENT DOCUMENTS

| | | | |
|---|---|---|---|
| 5,680,442 A | 10/1997 | Bartholomew et al. | |
| 5,684,862 A | 11/1997 | Finnigan | |
| 5,687,220 A | 11/1997 | Finnigan | |
| 5,692,033 A | 11/1997 | Farris | |
| 5,712,903 A | 1/1998 | Bartholomew et al. | |
| 5,717,742 A | 2/1998 | Hyde-Thomson | |
| 5,740,230 A | 4/1998 | Vaudreuil | |
| 5,740,231 A | 4/1998 | Cohn et al. | |
| 5,742,668 A | 4/1998 | Pepe et al. | |
| 5,742,763 A | 4/1998 | Jones | |
| 5,742,769 A | 4/1998 | Lee et al. | |
| 5,742,905 A | 4/1998 | Pepe et al. | |
| 5,764,747 A | 6/1998 | Yue et al. | |
| 5,768,348 A | 6/1998 | Solomon et al. | |
| 5,790,637 A | 8/1998 | Johnson et al. | |
| 5,802,466 A | 9/1998 | Gallant et al. | |
| 5,812,639 A | 9/1998 | Bartholomew et al. | |
| 5,812,670 A | 9/1998 | Micali | |
| 5,832,072 A | 11/1998 | Rozenblit | |
| 5,832,221 A | 11/1998 | Jones | |
| 5,838,768 A | 11/1998 | Sumar et al. | |
| 5,848,132 A | 12/1998 | Morley et al. | |
| 5,884,160 A | 3/1999 | Kanazaki | |
| 5,905,774 A | 5/1999 | Tatchell et al. | |
| 5,930,479 A | 7/1999 | Hall | |
| 5,940,478 A | 8/1999 | Vaudreuil et al. | |
| 5,940,740 A | 8/1999 | Aas et al. | 340/7.22 |
| 5,987,317 A | 11/1999 | Venturini | |
| 5,999,595 A | 12/1999 | Shaffer et al. | |
| 6,002,751 A | 12/1999 | Shaffer | |
| 6,005,845 A | 12/1999 | Svennesson et al. | |
| 6,005,922 A | 12/1999 | Longster et al. | |
| 6,006,087 A | 12/1999 | Amin | 455/413 |
| 6,061,432 A | 5/2000 | Wallace et al. | |
| 6,064,876 A | 5/2000 | Ishida et al. | |
| 6,069,890 A | 5/2000 | White et al. | |
| 6,122,348 A | 9/2000 | French-St. George et al. | |
| 6,219,694 B1 | 4/2001 | Lazaridis et al. | 709/206 |
| 6,233,430 B1 | 5/2001 | Helferich | |
| 6,259,892 B1 | 7/2001 | Helferich | |
| 6,389,276 B1 | 5/2002 | Brilla et al. | |
| 6,393,908 B1 | 5/2002 | Swain et al. | |
| 6,408,176 B1 | 6/2002 | Urs | |
| 6,507,643 B1 | 1/2003 | Groner | 379/88.14 |
| 6,654,601 B2 | 11/2003 | Picoult et al. | |
| 6,707,890 B1 | 3/2004 | Gao et al. | 379/88.12 |
| 6,782,081 B2 | 8/2004 | Malik | |
| 6,865,384 B2 | 3/2005 | Sagi et al. | |
| 6,882,708 B1 | 4/2005 | Bedingfield et al. | |
| 6,981,223 B2 | 12/2005 | Becker et al. | |
| 6,999,565 B1 | 2/2006 | Delaney et al. | |
| 7,142,646 B2 | 11/2006 | Zafar et al. | |
| 7,167,546 B2 | 1/2007 | Moore | |
| 2001/0033639 A1 | 10/2001 | Martin | 379/88.14 |
| 2001/0044297 A1 | 11/2001 | Myer et al. | |
| 2002/0067806 A1 | 6/2002 | Rodriguez et al. | 379/88.12 |
| 2002/0077082 A1 | 6/2002 | Cruickshank | |
| 2002/0087643 A1 | 7/2002 | Parsons et al. | 709/206 |
| 2002/0090963 A1 | 7/2002 | Avalos et al. | 455/466 |
| 2002/0110226 A1 | 8/2002 | Kovales et al. | |
| 2002/0173306 A1 | 11/2002 | Adamany et al. | |
| 2002/0173308 A1 | 11/2002 | Dorenbosch et al. | 455/435 |
| 2002/0181673 A1 | 12/2002 | Henry et al. | |
| 2003/0002632 A1 | 1/2003 | Bhogal et al. | |
| 2003/0027560 A1 | 2/2003 | Jammal | 455/417 |
| 2003/0095643 A1* | 5/2003 | Fortman et al. | 379/88.14 |
| 2003/0131143 A1* | 7/2003 | Myers | 709/318 |
| 2003/0147512 A1 | 8/2003 | Abburi | 379/88.22 |
| 2003/0194990 A1 | 10/2003 | Helferich | |
| 2003/0229670 A1 | 12/2003 | Beyda | |
| 2004/0076272 A1* | 4/2004 | Zafar et al. | 379/88.13 |
| 2004/0161089 A1 | 8/2004 | Hanson et al. | 379/88.17 |
| 2005/0020288 A1 | 1/2005 | Davis et al. | |
| 2005/0055411 A1 | 3/2005 | Bouchard et al. | 709/206 |
| 2005/0136896 A1 | 6/2005 | Ward et al. | |
| 2005/0286689 A1 | 12/2005 | Vuori | |

FOREIGN PATENT DOCUMENTS

| | | |
|---|---|---|
| EP | 0412799 | 2/1991 |
| EP | 0507125 | 10/1992 |
| EP | 0543235 | 5/1993 |
| EP | 0624967 | 11/1994 |
| EP | 0662762 | 7/1995 |
| EP | 0782304 A2 | 7/1997 |
| EP | 0782315 A2 | 7/1997 |
| EP | 0782316 A2 | 7/1997 |
| EP | 0813162 A2 | 12/1997 |
| EP | 0825752 A2 | 2/1998 |
| EP | 0841796 A2 | 5/1998 |
| EP | 0843453 A2 | 5/1998 |
| EP | 0886228 A2 | 12/1998 |
| EP | 0841796 A3 | 9/1999 |
| EP | 0255325 | 6/2007 |
| WO | 9708901 | 3/1997 |

OTHER PUBLICATIONS

M. Day et al.; A Model for Presence and Instant Messaging; Feb. 2000; pp. 1-17.

M. Day, et al., A Model for Presence and Instant Messaging, Feb. 2000, pp. 1-17.

M. Day, et al., Instant Messaging/Presence Protocol Requirements, Feb. 2000, pp. 1-26.

An Enhanced Message Networking Topology: Multimedia Messaging with the Intuity (TM) Interchange Server, Bell Labs Technical Journal, Apr.-Jun. 1998, pp. 124-135.

Die T-Net-Box-der Anrufbeantworter in Netz, XP-000861610, 1998.

General Recommendations on Telephone Switching and Signalling-Introduction to Intelligent Network Capability Set 1, International Telecommunication Union, XP-002141945, Mar. 1993.

The Belcore and ITU-T Call Model Operations, XP-002141946, 1998.

Transactions in Intelligent Networks, XP-002141947, 1998.

Voice Services on the Intelligent Network: Intelligent Peripherals and Service Nodes, F. Bosco, XP-000607359, Aug. 1992.

James Carlton Bedingfield, Non Final Office Action, mailed Apr. 1, 2003, filing date Feb. 25, 2000 U.S. Appl. No. 09/513,005 (Note: copy not provided as it is part of PTO records).

James Carlton Bedingfield, Final Office Action, mailed Jan. 28, 2004, filing date Feb. 25, 2000 U.S. Appl. No. 09/513,005 (Note: copy not provided as it is part of PTO records).

James Carlton Bedingfield, Non Final Office Action, mailed Jul. 1, 2004, filing date Feb. 25, 2000 U.S. Appl. No. 09/513,005 (Note: copy not provided as it is part of PTO records).

James Carlton Bedingfield, Notice of Allowance Fees, mailed Aug. 25, 2004, filing date Feb. 25, 2000 U.S. Appl. No. 09/513,005 (Note: copy not provided as it is part of PTO records).

Gao et al., Non Final Office Action, mailed Mar. 24, 2003, filing date Sep. 3, 2002 U.S. Appl. No. 10/232,749 (Note: copy not provided as it is part of PTO records).

Gao et al., Final Office Action, mailed Jul. 11, 2003, filing date Sep. 3, 2002 U.S. Appl. No. 10/232,749 (Note: copy not provided as it is part of PTO records).

Gao et al., Notice of Allowance and Fees, mailed Oct. 17, 2003, filing date Sep. 3, 2002 U.S. Appl. No. 10/232,749 (Note: copy not provided as it is part of PTO records).

Royce D. Jordan Jr., Requirement for Restriction/Election, mailed Sep. 9, 2004, filing date Mar. 14, 2003 U.S. Appl. No. 10/097,278 (Note: copy not provided as it is part of PTO records).

Royce D. Jordan Jr., Non Final Office Action, mailed Jan. 14,2005, filing date Mar. 14, 2003 U.S. Appl. No. 10/097,278 (Note: copy not provided as it is part of PTO records).

Royce D. Jordan Jr., Final Office Action, mailed Jul. 14,2005, filing date Mar. 14, 2002 U.S. Appl. No. 10/097,278 (Note: copy not provided as it is part of PTO records).

Royce D. Jordan Jr., Non final Office Action, mailed Dec. 5,2005, filing date Mar. 14, 2002 U.S. Appl. No. 10/097,278 (Note: copy not provided as it is part of PTO records).

Royce D. Jordan Jr., Examiners interview, mailed Jan. 4,2005, filing date Mar. 14, 2002 U.S. Appl. No. 10/097,278 (Note: copy not provided as it is part of PTO records).

Royce D. Jordan Jr., Final Office Action, mailed May 18, 2006, filing date Mar. 14, 2002 U.S. Appl. No. 10/097,278 (Note: copy not provided as it is part of PTO records).

Royce D. Jordan Jr., Notice of Allowance and Fees, mailed Aug. 22, 2006, filing date Mar. 14, 2002 U.S. Appl. No. 10/097,278 (Note: copy not provided as it is part of PTO records).

Royce D. Jordan Jr., Examiner Interview Summary, mailed Oct. 20,2005, filing date Jan. 4, 2005 U.S. Appl. No. 11/028,973 (Note: copy not provided as it is part of PTO records).

Royce D. Jordan Jr., Final Office Action, mailed Jan 10,2005, filing date Jan. 4, 2005 U.S. Appl. No. 11/028,973 (Note: copy not provided as it is part of PTO records).

Royce D. Jordan Jr., Non Final Office Action, mailed Jun. 28,2006, filing date Jan. 4, 2005 U.S. Appl. No. 11/028,973 (Note: copy not provided as it is part of PTO records).

Royce D. Jordan Jr., Non Final Office Action, mailed Jul. 14,2005, filing date Jan. 4, 2005 U.S. Appl. No. 11/028,973 (Note: copy not provided as it is part of PTO records).

Royce D. Jordan Jr., Final Office Action, mailed Dec. 13, 2006, filing date Jan. 4, 2005 U.S. Appl. No. 11/028,973 (Note: copy not provided as it is part of PTO records).

Royce D. Jordan Jr., Examiner Interview Summary, mailed Feb. 22,2007, filing date Jan. 4, 2005 U.S. Appl. No. 11/028,973 (Note: copy not provided as it is part of PTO records).

Royce D. Jordan Jr., Non Final Office Action, mailed Mar. 30,2007, filing date Jan. 4, 2005 U.S. Appl. No. 11/028,973 (Note: copy not provided as it is part of PTO records).

James Carlton Bedingfield, Non Final Office Action, mailed Feb. 10,2006, filing date Feb. 13, 2003 U.S. Appl. No. 10/369,445 (Note: copy not provided as it is part of PTO records).

James Carlton Bedingfield, Final Office Action, mailed Jul. 24,2006, filing date Feb. 13, 2003 U.S. Appl. No. 10/369,445 (Note: copy not provided as it is part of PTO records).

James Carlton Bedingfield, Notice of Allowance and Fees, mailed Jun. 1,2007, filing date Feb. 13, 2003 U.S. Appl. No. 10/369,445 (Note: copy not provided as it is part of PTO records).

Maria Adamczyk, Non Final Office Action, mailed Apr. 22,2005, filing date Jan. 31, 2003 U.S. Appl. No. 10/355,931 (Note: copy not provided as it is part of PTO records).

Maria Adamczyk, Final Office Action, mailed Nov. 22,2005, filing date Jan. 31, 2003 U.S. Appl. No. 10/355,931 (Note: copy not provided as it is part of PTO records).

Maria Adamczyk, Non Final Office Action, mailed Aug. 10,2006, filing date Jan. 31, 2003 U.S. Appl. No. 10/355,931 (Note: copy not provided as it is part of PTO records).

Maria Adamczyk, Notice of Allowance and Fees, mailed Feb. 7,2007, filing date Jan. 31, 2003 U.S. Appl. No. 10/355,931 (Note: copy not provided as it is part of PTO records).

Mary Arnoff, Non Final Office Action, mailed Mar. 24,2006, filing date May 5, 2004 U.S. Appl. No. 10/839,535 (Note: copy not provided as it is part of PTO records).

Mary Arnoff, Final Office Action, mailed Apr. 23,2007, filing date May 5, 2004 U.S. Appl. No. 10/839,535 (Note: copy not provided as it is part of PTO records).

Arnoff; Non-Final Office Action, mailed Oct. 31, 2007; U.S. Appl. No. 10/839,535; filed May 5, 2004 (Note: copy not provided as it is part of PTO records).

* cited by examiner

VOICE MAIL NOTIFICATION USING INSTANT MESSAGING

This is a continuation application of U.S. application Ser. No. 10/232,749 filed Sep. 3, 2002, now U.S. Pat. No. 6,707,809 which is herein incorporated by reference in its entirety.

BACKGROUND OF THE INVENTION

Most, if not all, telephone users have at least one voice mailbox in which callers can leave voice messages when the users are unavailable to answer calls. Voicemails are typically retrieved by the users in a number of ways. For example, using a telephone set in her office, a voicemail user who returns from a lunch break can hear voicemails that were left at her voice mailbox while she was at lunch. Alternatively, the voicemail user could remotely dial in (e.g., from her home or while she is out of town) to her voice mailbox to retrieve the voicemail messages. Regardless of the method used, the voicemail user must first access her voicemail server to determine whether or not a new message has been stored in her voice mailbox since the last time she checked the mailbox. This can be inconvenient to the user.

Accordingly, there is a need for a system and method that would notify the user instantaneously when a voicemail has arrived at her voice mailbox.

SUMMARY OF THE INVENTION

The present invention is a system and method that provides enhanced notification of messages received by a voicemail server using instant messaging. In a preferred embodiment, the invention provides an enhanced notification server that works with a voicemail server and an instant messaging presence server to notify an instant messaging client of messages received at the voicemail server. When a new message, e.g., a voicemail, a fax message, or the like, intended for a subscriber of a voice mailbox is received, the voicemail server sends a notification to the enhanced notification server. The enhanced notification server then queries the instant messaging presence server to determine whether the voice mailbox subscriber (who is also the instant messaging client) is available. "Available" means the instant messaging client is online, engaged in an instant messaging session, or otherwise logged on to the instant messaging presence server. If the instant messaging client is available, the enhanced notification server forwards the notification to the instant messaging client. Preferably, forwarding of the notification to the instant messaging client (the voice mailbox subscriber) is accomplished via the instant messaging presence server. The enhanced notification server queues the notification for a later delivery if the instant messaging client is not available.

In another preferred embodiment, the invention provides a method for notifying an instant messaging client of messages received by a voicemail server of which the instant messaging client is a voice mailbox subscriber. The methods include the following steps. First, when the voicemail server receives a message, e.g., a voicemail, a fax message, and the like, which is intended for the instant messaging client, the voicemail server sends a notification to an enhanced notification server. The notification indicates that a new message is available on the voicemail server for retrieval. The enhanced notification server then queries an instant messaging presence server whether the instant messaging client is available. If the voice mailbox subscriber (who is also the instant messaging client) is available, the enhanced notification server forwards the notification to the instant messaging presence server, which in turns forwards the notification to the instant messaging client using known instant messaging technologies.

In other embodiments, the invention can be adapted to forward the incoming message to the voice mailbox subscriber via instant messaging.

DETAILED DESCRIPTION OF THE INVENTION

Figure 1:
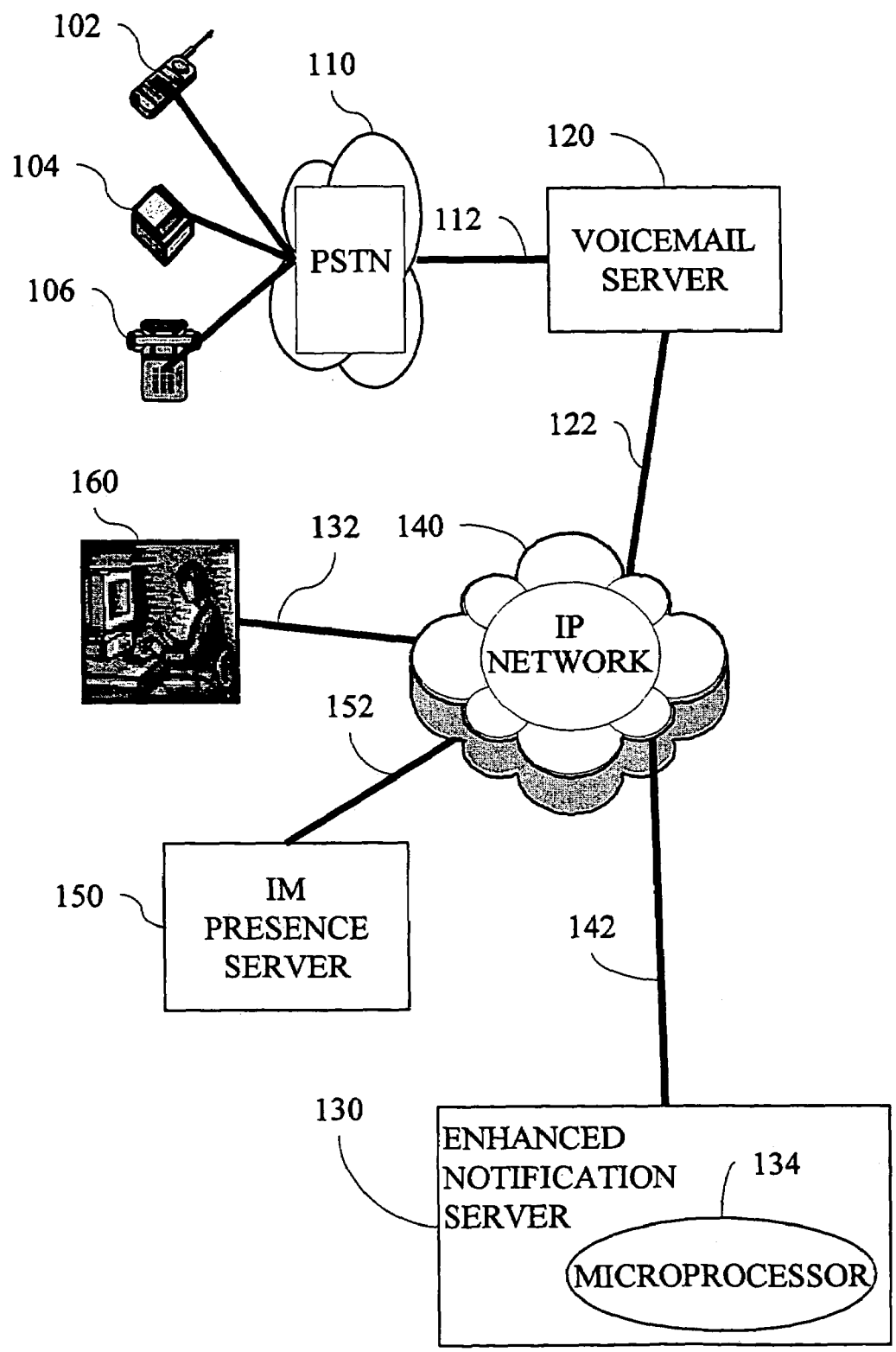
FIG. 1 is a schematic diagram showing the system architecture used in a preferred embodiment of the invention.

FIG. 1 is a schematic diagram showing the system architecture used in a preferred embodiment of the invention. PSTN 110, voicemail (VM) server 120, IP network 140, and instant messaging (IM) presence server 150 are known elements in the art. As shown in FIG. 1, PSTN 110 is accessible to users via one or more of wireless telephone 102, fax machine 104, and wireline telephone 106. Although not indicated in FIG. 1, PSTN 100 can be accessible to other telecommunications devices including, for example, a computer with a modem, an interactive pager, a personal digital assistant, and the like.

As known in the art, voicemail server 120 can receive voicemail, fax messages, and the like from various sources including, for example, PSTN 110, through link 112. Voicemail server 120 is in communication with IP network 140 via link 122. Voicemail server 120 and IP network 140 can communicate with each other using known protocols, including, for example, TCP/IP.

Preferably, voicemail server 120 is adapted to provide traditional voicemail features as well as new features. Voicemail server 120 preferably includes a profile for each of its voice mailbox subscribers regarding how notification of incoming messages should be performed. Preferably, voicemail server 120 is adapted to initiate the notification by communicating with enhanced notification server 130. Communications between voicemail server 120 and enhanced notification server 130 can be accomplished via IP network 140 and links 122 and 142.

As known in the art, there are a number of different protocols used by different instant messaging service providers. For example, each of AOL, Yahoo!, and MSN uses its own protocol for its instant messaging service. Accordingly, communication sessions between enhanced notification server 130 and instant messaging presence server 150 is facilitated by the appropriate protocol associated with instant messaging presence 150.

Preferably, enhanced notification server 130 includes microprocessor 134. Microprocessor 134 is preferably adapted to provide a number of functionalities. For example, in a preferred embodiment of the invention, enhanced notification server 130 can query instant messaging presence server 150 whether instant messaging client 160 is available. For example, enhanced notification server 130 can query instant messaging presence server 150 whether instant messaging client 160 (voicemail subscriber) has an active instant messaging session. If instant messaging client 160 is available, enhanced notification server 130 forwards the notification to instant messaging client 160. The notification is preferably forwarded via IP network 140 and instant messaging presence server 150 through links 142, 152, and 132.

Figure 2:
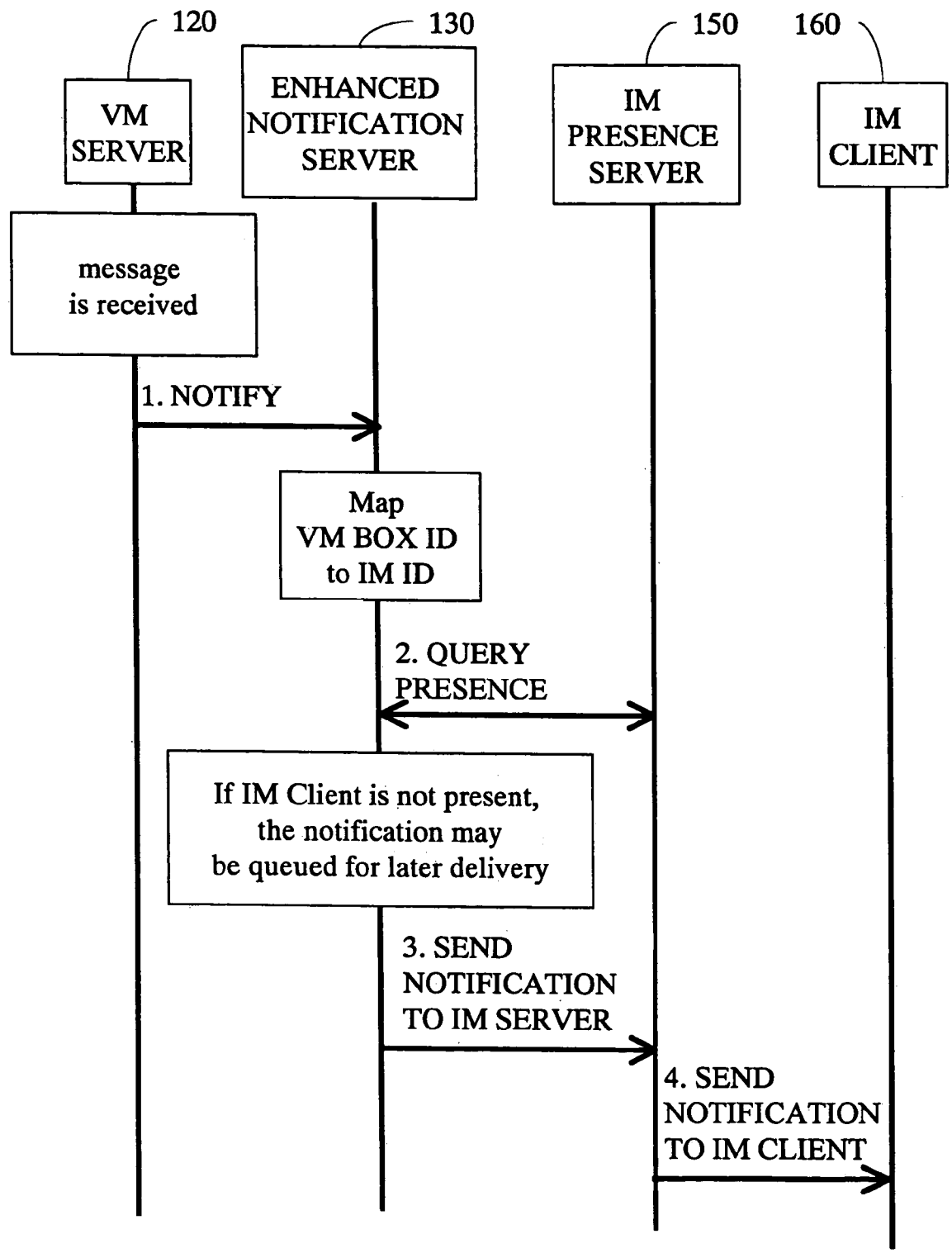
FIG. 2 is a schematic diagram summarizing the sequence of activities of a preferred embodiment that involves a voicemail server, an enhanced notification server, an instant messaging presence server, and an instant messaging client.

FIG. 2 is a schematic diagram summarizing the sequence of activities involving voicemail server 120, enhanced notification server 130, instant messaging presence server 150, and instant messaging client 160. As shown in FIG. 2, communications between enhanced notification server 130 and instant messaging presence server 150 include multiple queries and responses regarding the presence or availability of instant messaging client 160. Additional details regarding FIG. 2 are explained in conjunction with the description of FIG. 3 below.

Figure 3:
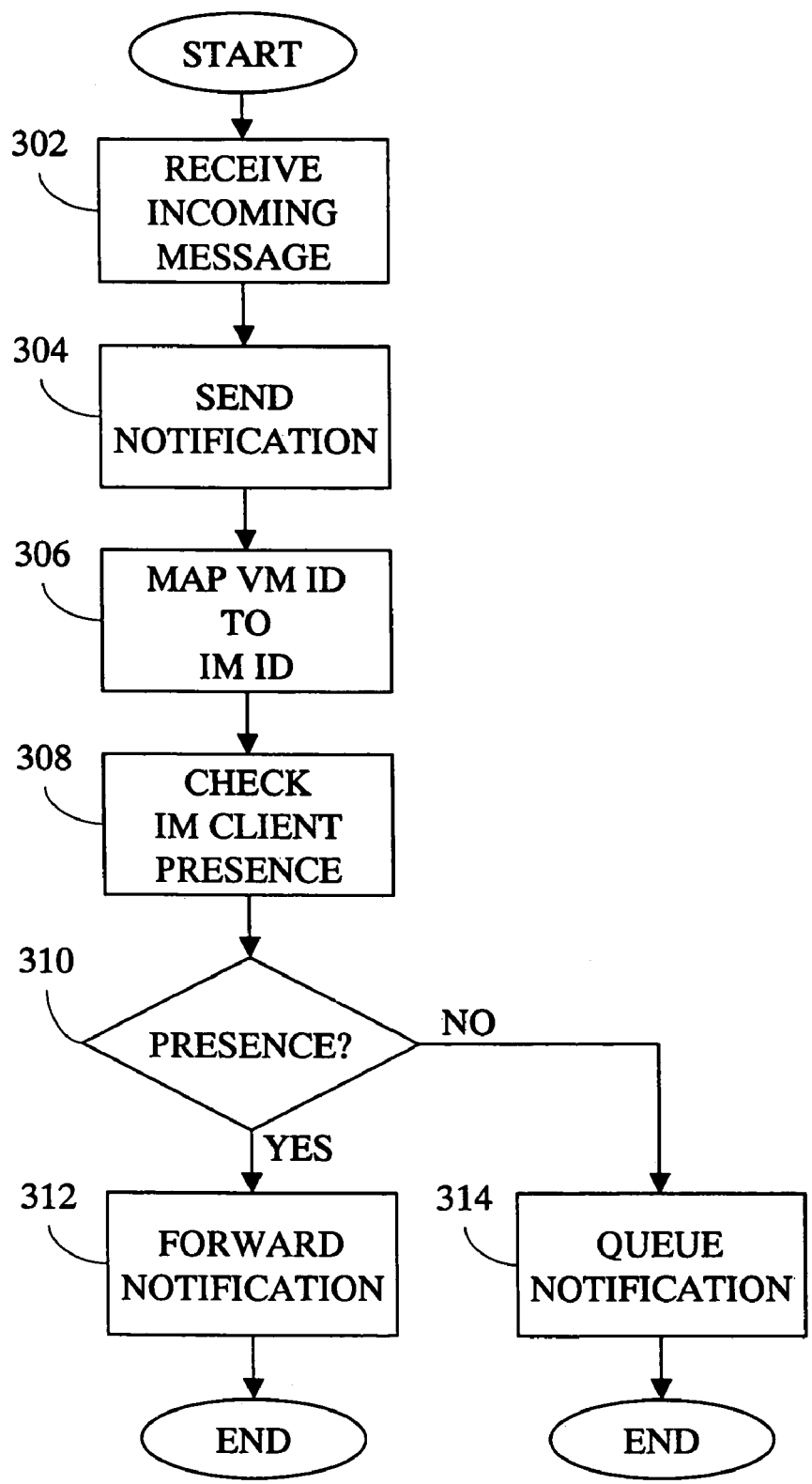
FIG. 3 is a flowchart showing exemplary steps involved in implementing a preferred embodiment of the invention.

FIG. 3 is a flowchart showing exemplary steps involved in implementing a preferred embodiment of the invention.

In step 302, an incoming message (e.g., voice, fax, or the like) intended for a voice mailbox subscriber is received at voicemail server 120.

In step 304, voicemail server 120 sends a notification to enhanced notification server 130. The notification may include a number of attributes associated with the incoming message including, for example, the date and time on which the incoming message was received, the identity of the sender of the incoming message, the length (or size) of the incoming message, and so on. The notification preferably includes a voice mailbox identification of the voice mailbox subscriber. The voice mailbox identification can be, for example, a telephone number associated with the voice mailbox subscriber.

In step 306, enhanced notification server 130 maps the voice mailbox identification (VM ID) to an instant messaging identification (IM ID). Note that both the VM ID and the IM ID belong to a common entity. The common entity is instant messaging client 160 that is also the voice mailbox subscriber for which the incoming message is intended. The IM ID can be, for example, an alphanumeric character string associated with instant messaging client 160.

In step 308, enhanced notification server 130 checks the presence status or availability of instant messaging client 160. Preferably, the IM ID is utilized in this step.

In step 310, if it is determined that instant messaging client 160 is present or available, the process goes to step 312; otherwise, the process goes to step 314.

In step 312, the notification is forwarded by enhanced notification server 130 to instant messaging client 160. Preferably, the notification is forwarded via instant messaging presence server 150.

In step 314, the notification is queued at enhanced notification server 130 for a later delivery until instant messaging client 160 is available.

Figure 4:
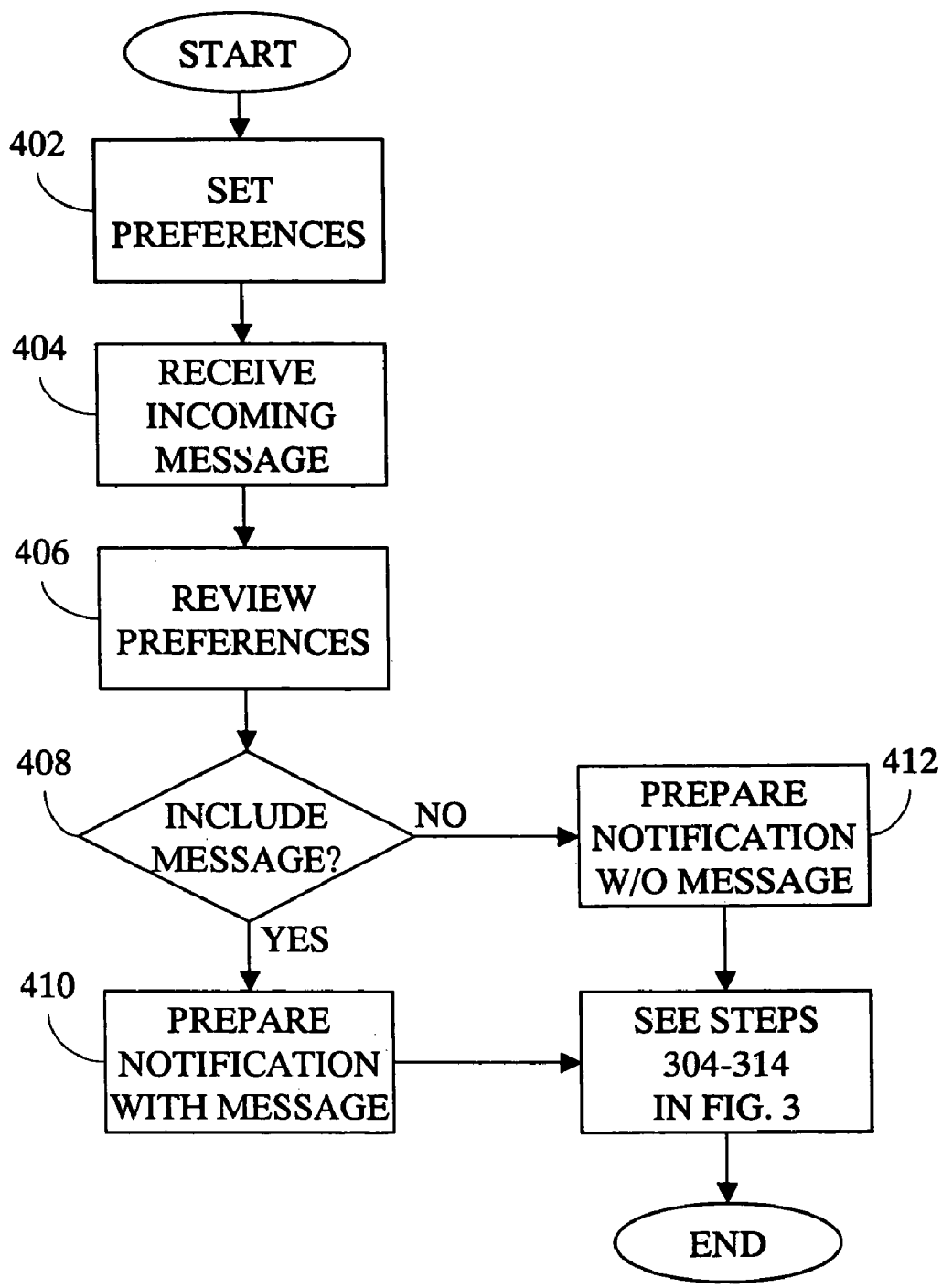
FIG. 4 is a flowchart showing exemplary steps involved in implementing another preferred embodiment of the invention.

FIG. 4 is a flowchart showing exemplary steps involved in implementing another preferred embodiment of the invention. In this embodiment, the invention enables a user of the invention, e.g., the voice mailbox subscriber or instant messaging client 160 discussed above, to receive the incoming message along with the notification. In this embodiment, voicemail server 120 is adapted to attach the incoming message to the notification.

In step 402, preferences are set. The preferences may include, for example, the user's desire to receive the incoming message in addition to the notification via instant messaging. Preferences are stored in a location that is accessible to voicemail server 120.

In step 404, voicemail server 120 receives an incoming message.

In step 406, voicemail server 120 reviews the preferences set in step 402.

In step 408, if the preferences have been set such a way that the user does not wish to have the incoming message attached to a notification, the process goes to step 412; otherwise, the process goes to step 410.

In step 410, voicemail server 120 prepares a notification with the incoming message attached to the notification.

In step 412, voicemail server 120 prepares a notification without the incoming message attached to the notification.

Following one of steps 410 and 412, steps generally similar to steps 304 through 314 shown in FIG. 3 and discussed above may be used to implement this embodiment.

Figure 5:
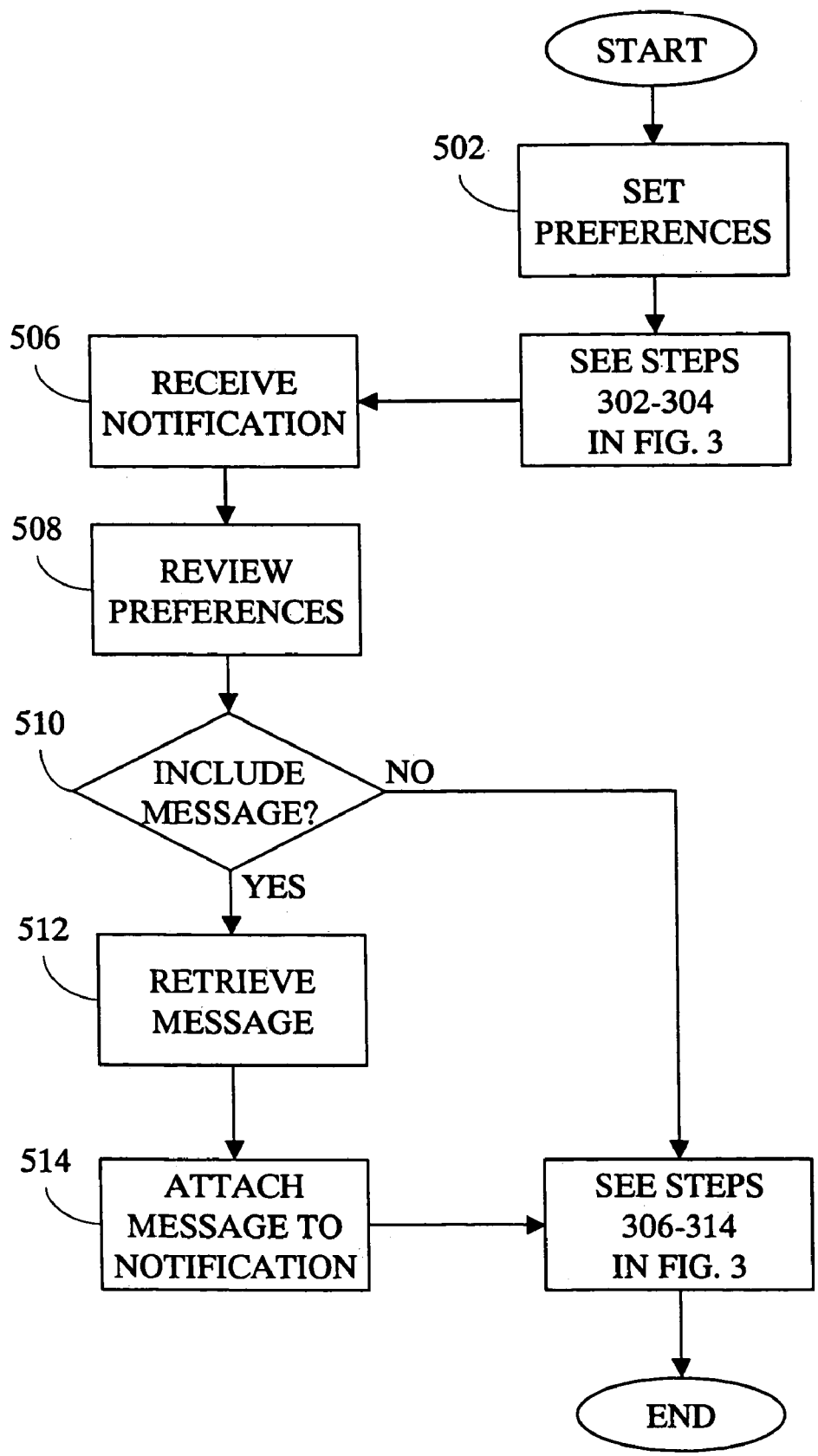
FIG. 5 is a flowchart showing exemplary steps involved in implementing another preferred embodiment of the invention.

FIG. 5 is a flowchart showing exemplary steps involved in implementing another preferred embodiment of the invention. In this embodiment, the invention enables a user of the invention to receive the incoming message along with the notification. In this embodiment, enhanced notification server 130 is adapted to retrieve the incoming message from voicemail server 120 and attach the incoming message to the notification.

In step 502, preferences are set. The preferences may include, for example, the user's desire to receive the incoming message in addition to the notification via instant messaging. Preferences are stored in a location that is accessible to enhanced notification server 130.

After step 502 but before step 506, steps generally similar to steps 302 through 304 shown in FIG. 3 and discussed above may be used to implement this invention.

In step 506, enhanced notification server 130 receives a notification from voicemail server 120 that an incoming message has been received by voicemail server 120.

In step 508, enhanced notification server 130 reviews the preferences set in step 502.

In step 510, if the preferences have been set such a way that the user does not wish to have the incoming message attached to the notification via instant messaging, the process goes to steps that are generally similar to steps 306 through 314 shown in FIG. 3 and described above. Otherwise, the process goes to step 512.

In step 512, enhanced notification server 130 communicates with voicemail server 120 to retrieve the incoming message.

In step 514, enhanced notification server 130 attaches the incoming message to the notification.

Following step 514, steps generally similar to steps 306 through 314 shown in FIG. 3 and discussed above may be used to implement this embodiment.

Figure 6:
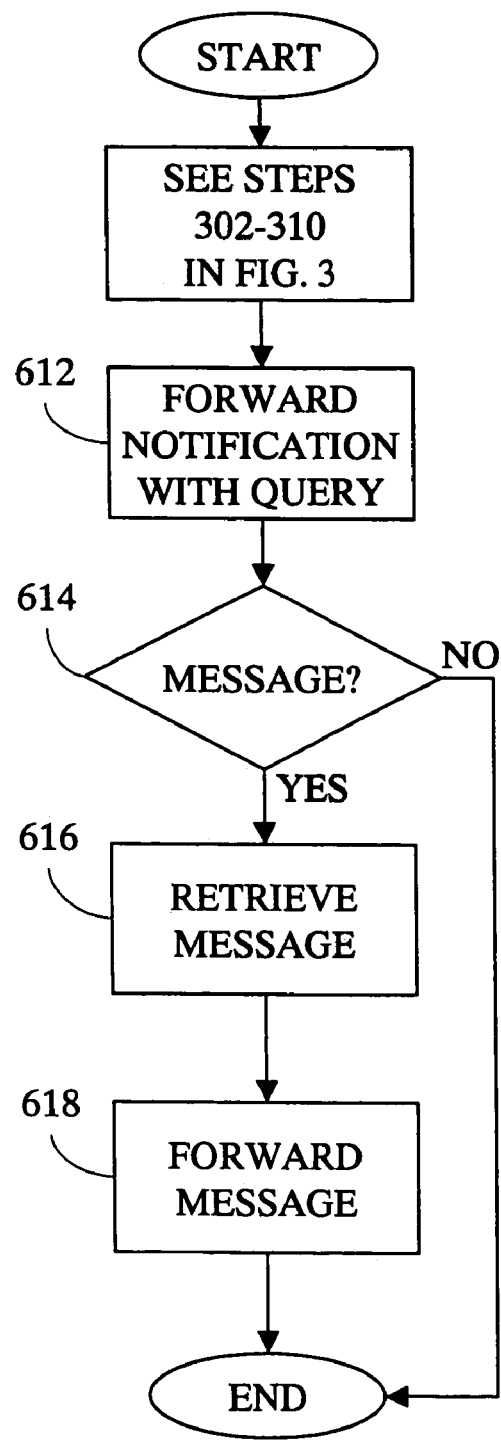
FIG. 6 is a flowchart showing exemplary steps involved in implementing another preferred embodiment of the invention.

FIG. 6 is a flowchart showing exemplary steps involved in implementing another preferred embodiment of the invention. In this embodiment, the invention enables a user of the invention to receive the incoming message via instant messaging after reviewing the notification. In this embodiment, enhanced notification server 130 is adapted to retrieve the incoming message from voicemail server 120 after receiving a respond from the user that the user wishes to receive the incoming message via instant messaging.

Steps similar to steps 302 through 310 shown in FIG. 3 and discussed above may be used to implement this embodiment.

Following step 310, in step 612, enhanced notification server 130 forwards the notification to the user. Here, the notification includes a query whether the user wishes to receive the incoming message via instant messaging.

If in step 614 the user responds with an affirmative answer, the process goes to step 616. Otherwise, the process ends.

In step 616, enhanced notification server 130 communicates with voicemail server 120 to retrieve the incoming message.

In step 618, after the incoming message is received from voicemail server 120, enhanced notification server 130 forwards the incoming message to the user via instant messaging.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method, at an enhanced notification server, for notification of messages comprising:
   receiving a notification from a first message server, wherein the notification includes information related to an incoming message that is intended for a subscriber, wherein the notification further includes a first identification associating the subscriber with the first message server;
   determining at least one user preference setting, wherein the at least one user preference setting indicates whether the subscriber desires to receive the incoming message with the notification;
   mapping the first identification to a second identification, wherein the second identification associates the subscriber with a second message server;
   querying the second message server using the second identification, to determine current availability of the subscriber on a communications device associated with the second message server;
   in response to a determination that the subscriber is currently available on the communications device, forwarding the notification to the communications device; and
   in response to a determination that the subscriber is currently not available on the communications device, queuing the notification at the enhanced notification server for later delivery.

2. The method of claim 1, wherein the first message server is a voicemail server.

3. The method of claim 1, wherein the information related to an incoming messages includes one or more of the following: an identity of a sender of the incoming message, a date of the incoming message, a time of the incoming message, a size of the incoming message.

4. The method of claim 1, wherein the second message server is an instant messaging presence server.

5. The method of claim 1, wherein the communications device is an instant messaging client.

6. The method of claim 1, further comprising, in response to a determination that the at least one user preference setting indicates that the subscriber prefers to receive the incoming message with the notification, attaching the incoming message to the notification.

7. An enhanced notification server configured to:
   receive a notification from a first message server, wherein the notification includes information related to an incoming message that is intended for a subscriber, wherein the notification further includes a first identification associating the subscriber with the first message server;
   determine at least one user preference setting, wherein the at least one user preference setting indicates whether the subscriber desires to receive the incoming message with the notification;
   map the first identification to a second identification, wherein the second identification associates the subscriber with a second message server;
   query the second message server using the second identification, to determine current availability of the subscriber on a communications device associated with the second message server;
   in response to a determination that the subscriber is currently available on the communications device, forward the notification to the communications device; and
   in response to a determination that the subscriber is currently not available on the communications device, queue the notification at the enhanced notification server for later delivery.

8. The server of claim 7, wherein the first message server is a voicemail server.

9. The server of claim 7, wherein the information related to an incoming messages includes at least one of the following: an identity of a sender of the incoming message, a date of the incoming message, a time of the incoming message, a size of the incoming message.

10. The server of claim 7, wherein the second message server is an instant messaging presence server.

11. The server of claim 7, wherein the communications device is an instant messaging client.

12. The server of claim 7, further configured to, in response to a determination that the at least one user preference setting indicates that the subscriber prefers to receive the incoming message with the notification, attach the incoming message to the notification.

13. A method, at an enhanced notification server, for notification of messages comprising:
   receiving a notification from a first message server, wherein the notification includes information related to an incoming message that is intended for a subscriber, wherein the notification further includes a first identification associating the subscriber with the first message server;
   mapping the first identification to a second identification, wherein the second identification associates the subscriber with a second message server;
   querying the second message server, using the second identification, to de current availability of the subscriber on a communications device associated with the second message server;
   in response to a determination that the subscriber is currently available on the communications device, forwarding the notification to the communications device, wherein the notification includes a query of whether the subscriber desires to receive the incoming message via the second message server;
   in response to a determination that the subscriber is not currently available on the communications device, queuing the notification at the enhanced notification server for later delivery; and
   in response to receiving a response to the query, indicating that the subscriber desires to receive the incoming message via the second messaging server, retrieving the incoming message from the first messaging server.

14. The method of claim 13, wherein the first message server is a voicemail server.

15. The method of claim 13, further comprising forwarding the retrieved incoming message to the second messaging server.

16. The method of claim 13, wherein the second message server is an instant messaging presence server.

17. The method of claim 13, wherein the communications device is an instant messaging client.

* * * * *